Patented Feb. 23, 1943

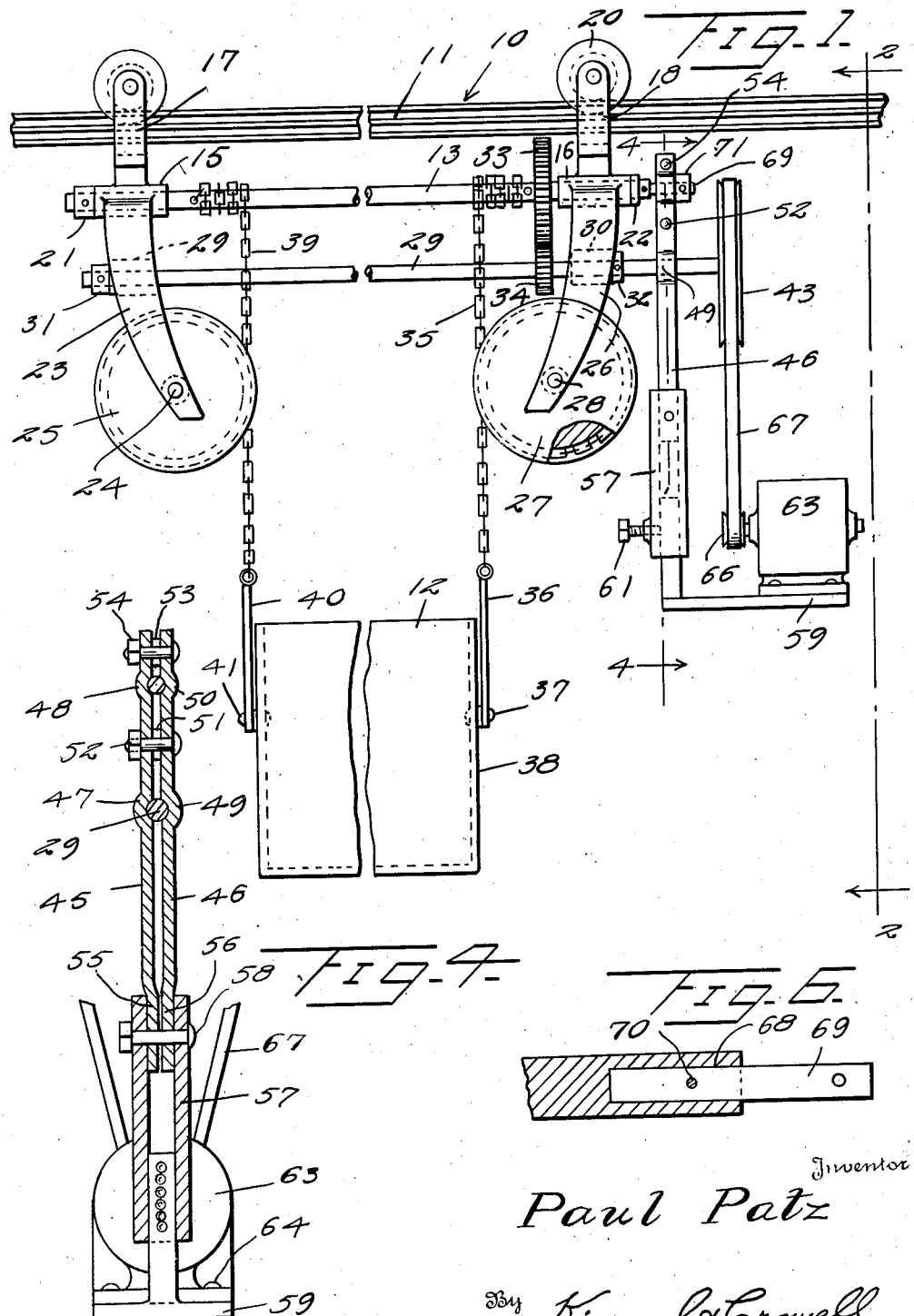

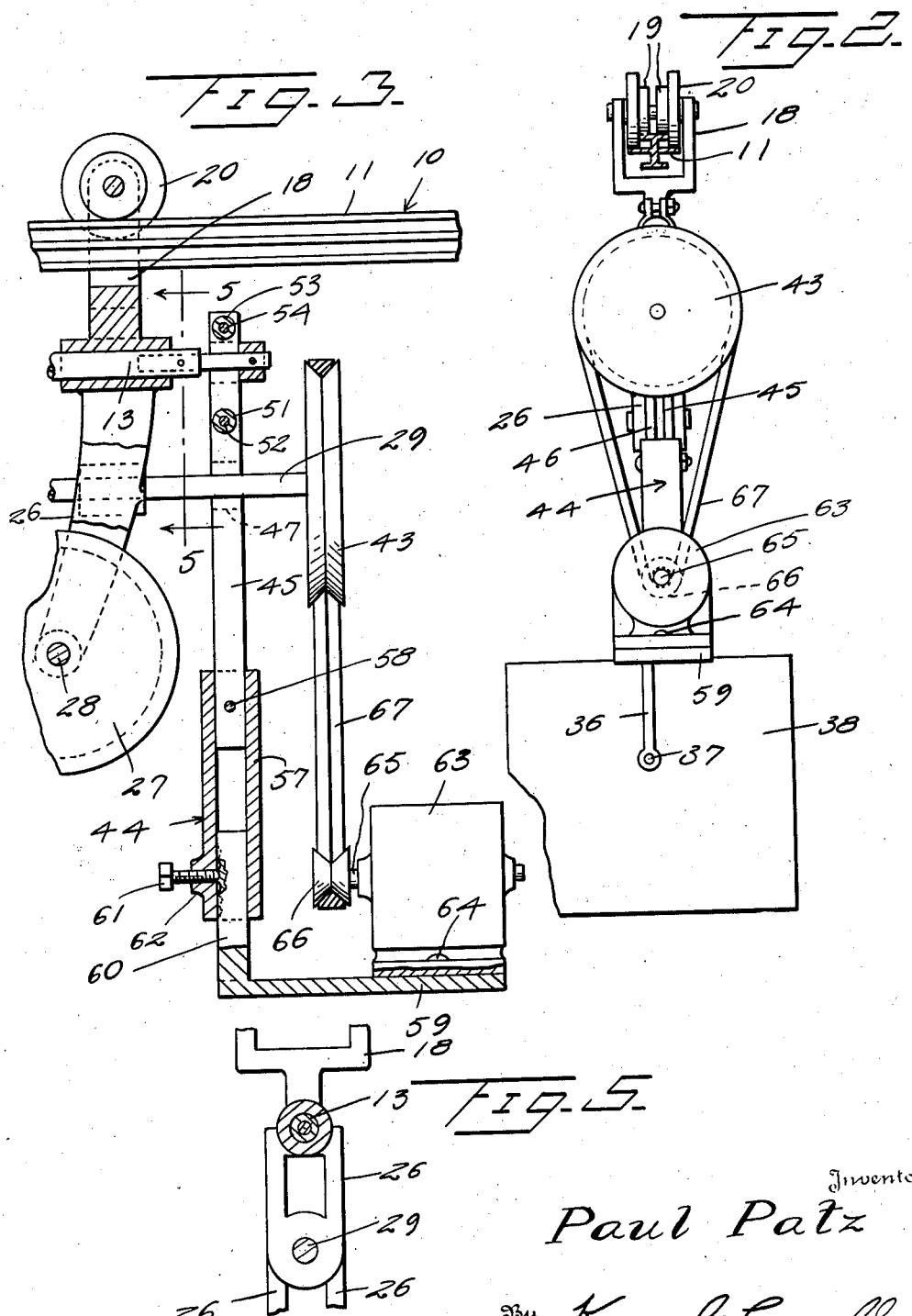

2,312,188

UNITED STATES PATENT OFFICE 2,312,188

POWER ATTACHMENT FOR COMPOST CARRIERS

Paul Patz, Pound, Wis.

Application June 15, 1942, Serial No. 447,121

8 Claims. (Cl. 212—134)

This invention relates to compost carriers and more particularly to a power attachment for a manually operable carrier.

An object of this invention is to provide an attachment which may be mounted on a conventional manually operable compost carrier so that such carrier may be converted at small cost into a power operated carrier.

Another object of this invention is to provide an attachment of this kind which may be readily mounted on the present parts of a compost carrier so as to convert the carrier from manual operation to power operation.

A further object of this invention is to provide an attachment of this kind which includes a supporting hanger, a motor platform, and means for suspending the hanger from the carrier so that the motor will move with the carrier along the carrier track.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail side elevation, partly broken away, of a compost carrier having a power attachment secured thereto which is constructed according to an embodiment of this invention;

Figure 2 is a sectional view taken on the line 2—2 of Figure 1;

Figure 3 is a fragmentary side elevation, partly in vertical section, of the attachment and carrier;

Figure 4 is a fragmentary sectional view, taken on the line 4—4 of Figure 1;

Figure 5 is a fragmentary sectional view taken on the line 5—5 of Figure 3;

Figure 6 is a fragmentary sectional view of one end of the winder shaft for the carrier.

Referring to the drawings the numeral 10 designates generally a conventional compost carrier structure which includes a horizontally disposed track 11 which is adapted to be secured within a barn or other building and the numeral 12 designates a bucket which is movably supported, as will hereinafter be described, from the track 11. A winder shaft 13 is rotatably supported in a pair of bearings 15 and 16 which are dependingly carried by U-shaped supporting members 17 and 18 respectively.

The U-shaped member 17 extends upwardly on opposite sides of the track 11 and has journalled between the arms thereof a pair of wheels 19 which movably engage the track 11. The U-shaped supporting member 18 has journalled between the upright arms thereof a second pair of wheels 20 which also engage the track 11 so as to hold the winder shaft 13 in horizontal relation with respect to the track 11. The shaft 13 is held against endwise movement with respect to the bearings 15 and 16 by means of collars 21 and 22 which are secured to the shaft 13 adjacent the opposite ends thereof. The bearing 15 has dependingly secured thereto, a pair of spaced apart idler wheel supporting arms 23 which are of longitudinally arcuate configuration and which have rotatably mounted on a shaft 24, extending there-between, an idler wheel or pulley 25. The bearing 16 also has dependingly secured thereto a pair of arms 26 of longitudinally arcuate configuration, which have a pulley or wheel 27 disposed there-between and the wheel 27 is rotatably mounted on the shaft 28 extending between the two arms 26. A drive shaft 29 is disposed between the pair of arms 23 and also between the arms 26 being rotatably mounted in bearings 29' and 30 which are fixed between the arms 23 and the arms 26 respectively.

The drive shaft 29 is held against endwise movement by means of collars 31 and 32. The winder shaft 13 has fixed thereto a driven gear 33 and the drive shaft 29 has fixed thereto a driving gear 34 which meshes with the driven gear 33. The winder shaft 13 has trained thereabout a flexible bucket elevating and lowering member 35 which has one end fixed to the shaft 13 and the flexible member 35 is then trained for one complete revolution about the idler pulley 27 and has the opposite or lower end thereof fixed to a link 36 which is pivotally secured as by a pivot 37 to the side wall 38 of the bucket 12. The winder shaft 13 also has wound thereabout a second flexible elevating and lowering member 39 which has one end thereof secured to the winder shaft 13 and the flexible member 39 is then trained about the pulley 25 for at least one convolution and is secured at its lower end to a link 40 which is pivotally mounted as at 41 on the opposite side wall 42 of the bucket 12.

The carrier structure hereinbefore described, is a conventional carrier and is here shown and described as an illustrative example with which the hereinafter described power attachment may be combined.

The drive shaft 29, at one end thereof, has secured thereto a V-shaped pulley 43 and in conventional, manually operable carriers a flexible member is engaged with the pulley 43 so that the drive shaft 29 may be rotated to elevate or lower the bucket 12. In order to provide a means whereby the carrier structure 10 may be power driven I have provided an L-shaped bracket structure, generally designated as 44. The bracket structure 44 includes a pair of vertically disposed straps 45 and 46 and the strap 46 is formed with offset bearing portions 47 and 48. The strap 46 is formed with complementary offset bearing portions 49 and 50 so that the drive shaft 29 may be engaged between the two offset bearing portions 47 and 49, whereas the winder shaft 13 may be engaged between the offset bearing portions 48 and 50.

Where the winder shaft 13 is not of sufficient length for engagement between the bearing portions 48 and 50, the shaft 13 may be extended by providing an opening or socket 68 in one end of the shaft 13 and a pin or shaft extension 69 may be secured in the socket 68 by means of a fastening member 70. The shaft extension 69 may have a collar 71 secured thereto for holding the upper end portions of the straps 45 and 46 against outward movement with respect to the shaft 13.

A spacer block 51 is interposed between the two straps or bars 45 and 46 between the two shafts 13 and 29 and is secured therebetween by means of a fastening member 52. An upper spacer member or block 53 is interposed between the upper end portions of the straps or bars 45 and 46 and secured therebetween by means of a fastening member 54. The straps 45 and 46 have inwardly offset lower end portions 55 and 56 respectively and these offset lower end portions 55 and 56 are adapted to extend into the upper end portion of a tubular lower bracket member 57. The lower end portions of the straps 45 and 46 are secured in the upper end of the tubular member 57 by means of a fastening member 58.

A motor supporting platform 59 extends right angularly from the lower portion of the tubular member 57 and constitutes the horizontal leg of the L-shaped bracket 44. The platform 59 has secured to one edge thereof an upstanding stem 60 which is adapted to telescope into the lower end of the tubular member 57. The stem 60 is held in longitudinally adjusted position within the tubular member 57 by means of a set screw 61 which is threaded through the boss or enlargement 62 formed on the tubular member 57. An electric motor 63 is adapted to be secured, as by fastening means 64, to the upper side of the platform 59 and the armature shaft 65 of the motor 63 has secured thereto a grooved pulley 66 about which an endless V-belt 67 is trained. The belt 67 also engages about the driving pulley 43.

In the use and operation of this attachment the carrier 10 may have the extension pin or shaft 69 secured in one end thereof and the strap members 45 and 46 are then secured about the shaft 29 and the pin or shaft extension 69. The horizontal leg or platform 59 carrying the motor 63 may be vertically adjusted by means of the set screws 61 and endwise or vertical adjustment of the stem 60 within the lower end portion of the tubular vertical leg member 57. The motor 63 may be connected in any suitable manner to a source of electric current supply so that the carrier with the attachment may move lengthwise of the track 11 to the desired positions along this track. An attachment of this kind will permit the conversion of a manually operable carrier to a power operated carrier by simply securing the bracket structure 44, as hereinbefore described, and connecting the member 63 with the pulley 43.

What I claim is:

1. A power attachment for a compost carrier having a winding shaft and a drive shaft, said attachment comprising a bracket structure, a support therefor, means securing a portion of said bracket to said shafts, a motor mounted on the other leg of said bracket, an operative connection between said motor and said drive shaft, and means for securing a portion of said bracket in vertically adjusted position relative to another portion thereof.

2. A power attachment for a compost carrier having a winding shaft and a drive shaft, comprising a pin secured to and extending axially from an end of said winding shaft, an L-shaped bracket having means carried by one leg thereof for engagement about said pin and said drive shift for suspending said one leg in a vertical position, the other leg of said bracket being horizontal and constituting a motor platform, and means securing said other leg in vertically adjusted position relative to said vertical leg.

3. A power attachment for a compost carrier having a winding shaft and a drive shaft, comprising a pin secured to and extending axially from an end of said winding shaft, an L-shaped bracket having means carried by one leg thereof for engagement about said pin and said drive shaft for suspending said one leg in a vertical positon, the other leg of said bracket being horizontal and constituting a motor platform, means securing said other leg in vertically adjusted position relative to said vertical leg, said vertical leg including a pair of elongated straps formed with spaced apart shaft receiving portions, a tubular member fixed to the lower ends of said straps, an upright stem carried by said platform and means securing said stem in adjusted position in the lower end of said tubular member.

4. A power attachment for a compost carrier having a winding shaft and a drive shaft, comprising a pin secured to and extending axially from an end of said winding shaft, an L-shaped bracket having means carried by one leg thereof for engagement about said pin and said drive shaft for suspending said one leg in a vertical position, the other leg of said bracket being horizontal and constituting a motor platform, means securing said other leg in vertically adjusted position relative to said vertical leg, said vertical leg including a pair of elongated straps formed with spaced apart shaft receiving portions, spacer members secured between said straps adjacent said shaft receiving portions, a tubular member fixed to the lower ends of said straps, an upright stem carried by said platform and means securing said stem in adjusted position in the lower end of said tubular member.

5. A power attachment for suspension from the winder and drive shafts of a compost carrier, comprising an L-shaped bracket having one leg thereof vertical and the other leg thereof horizontal, a pin for attachment axially of said winder shaft, said vertical leg including a pair of vertical straps each having a complementary offset portion for receiving said pin and said drive shaft, spacer means fixed between said straps adjacent said offset portions, a lower tubular member fixed to the lower ends of said straps, said horizontal leg including a horizontal motor supporting platform, an upstanding stem fixed to said platform and telescoping into the lower end of said tubular member, and means securing said stem in adjusted position within said tubular member.

6. In combination, a compost carrier comprising a drive shaft, a winder shaft, a driven gear, a driving gear meshing with the driven gear, a flexible bucket elevating and lowering member fixed to said winder shaft, and adapted to be wound therearound, a second flexible elevating and lowering element having one end thereof secured to the winder shaft, a pulley wheel about which the other end of said second flexible member is trained, said flexible members being pivotally mounted at their other ends to the side wall of the carrier.

7. A power attachment for a compost carrier, having a winding shaft and a drive shaft, comprising a pin, a bracket having means carried thereby for engagement about said pin and said drive shaft for maintaining one portion of said bracket in vertical position, another portion of said bracket constituting a motor platform, an upright stem carried by said platform, and means securing said stem in adjusted position in respect to said carrier.

8. As a new article of manufacture, a power member supporting bracket for a manually operable compost carrier, comprising a bracket, means for suspending said bracket from the carrier, said bracket including opposed clamping means for engagement with said suspending means, and means whereby the length of said bracket may be extended.

PAUL PATZ.